United States Patent
Marx et al.

(10) Patent No.: US 6,950,504 B1
(45) Date of Patent: Sep. 27, 2005

(54) METHOD AND APPARATUS FOR PROVIDING PERSONAL AUDIO ALERT MESSAGING FOR AUDIO ALERTING CAPABLE TERMINALS

(75) Inventors: Joseph Marx, Kirkland, WA (US); Leland Yu, Redmond, WA (US)

(73) Assignee: Cingular Wireless II, Inc., Redmond, WA (US)

( * ) Notice: Subject to any disclaimer, the term of this patent is extended or adjusted under 35 U.S.C. 154(b) by 0 days.

(21) Appl. No.: 09/899,956

(22) Filed: Jul. 6, 2001

(51) Int. Cl.[7] .............................................. H04M 1/64
(52) U.S. Cl. .................................. 379/88.19; 455/415
(58) Field of Search .......................... 379/88.19, 88.2, 379/88.21; 455/412.1, 415, 445

(56) References Cited

U.S. PATENT DOCUMENTS

| | | | |
|---|---|---|---|
| 4,922,490 A | 5/1990 | Blakley | 370/110.1 |
| 4,979,206 A | 12/1990 | Padden et al. | 379/88 |
| 5,007,076 A * | 4/1991 | Blakley | 379/88.21 |
| 5,181,237 A | 1/1993 | Dowden et al. | 379/88 |
| 5,265,145 A | 11/1993 | Lim | 379/88 |
| 5,309,512 A * | 5/1994 | Blackmon et al. | 379/88.21 |
| 5,416,830 A | 5/1995 | MacMillan, Jr. et al. | 379/88 |
| 5,452,346 A | 9/1995 | Miyamoto | 379/142 |
| 5,511,111 A | 4/1996 | Serbetcioglu et al. | 379/67 |
| 5,526,406 A | 6/1996 | Luneau | 379/61 |
| 5,638,425 A | 6/1997 | Meador, III et al. | 379/88 |
| 5,651,053 A | 7/1997 | Mitchell | 379/67 |
| 5,752,191 A * | 5/1998 | Fuller et al. | 455/445 |
| 5,850,435 A | 12/1998 | Devillier | 379/374 |
| 5,930,701 A | 7/1999 | Skog | 455/415 |
| 6,266,399 B1 * | 7/2001 | Weller et al. | 379/88.19 |
| 6,330,308 B1 | 12/2001 | Cheston, III et al. | 379/88.04 |
| 6,577,859 B1 * | 6/2003 | Zahavi et al. | 455/412.1 |

* cited by examiner

*Primary Examiner*—Fan Tsang
*Assistant Examiner*—Gerald Gauthier
(74) *Attorney, Agent, or Firm*—Kenyon & Kenyon

(57) ABSTRACT

Embodiments of the present invention relate to a method, apparatus and system for providing personal audio alert messages (PAAM) to a called party and a calling party during a call connection. In response to a call origination by the calling party, a PAAM database may be queried. One ore more personal audio alert message (PAAM) strings may be received from a database in response to the query. A first PAAM string, from the one or more PAAM strings identifying the called party to the calling party, may be returned. The call may be routed to the called party. A second PAAM string and a third PAAM string may be returned, from the one or more PAAM strings, to the called party in the routed call. The call is connected if the called party accepts the call.

39 Claims, 9 Drawing Sheets

METHOD AND APPARATUS FOR PROVIDING PERSONAL AUDIO ALERT MESSAGING FOR AUDIO ALERTING CAPABLE TERMINALS

TECHNICAL FIELD

This invention relates generally to the field of telecommunications. More particularly, the invention provides personal audio alert messaging to users of communications devices.

BACKGROUND OF THE INVENTION

Existing telecommunications terminal devices, such as wired telephones or mobile communications devices, use conventional methods to indicate that a call is being connected or that a call is incoming. For example, when a calling party (i.e., call originator) places a call to a called party (i.e., call receiver), a ringing circuit in the central office (CO) switch may generate a ringing tone directed towards the calling party's receiver. The CO switch also generates a corresponding ring directed towards the called party device. Once the called party "picks up" or "goes off hook," the ringing circuit is removed and the call is connected.

Many times, a calling party may dial a wrong number either because the wrong number was provided to the calling party or because the calling party inadvertently dialed or entered the wrong number. Typically, the calling party will not realize that a wrong number has been dialed until after the call has been connected and the called party answers the call. This can be an inconvenience to both the called party and calling party. Moreover, unless the called party has caller identification (i.e., Caller ID) activated on her communications device, the called party may not know the identity of the calling party until the called party "picks up."

A method and system are desirable that overcome the problems encountered with known techniques for indicating, for example, the identity of the called party and/or calling party during call processing.

SUMMARY OF THE INVENTION

Embodiments of the present invention relate to a method, apparatus and system for providing personal audio alert messages to a called party and a calling party during a call connection. In response to a call origination by the calling party, a personal audio alert message (PAAM) database may be queried. One or more PAAM strings may be received from a database in response to the query. A first PAAM string, from the one or more PAAM strings identifying the called party to the calling party, may be returned. The call may be routed to the called party. A second PAAM string and a third PAAM string may be returned, from the one or more PAAM strings, to the called party in the routed call. The call is connected if the called party accepts the call.

BRIEF DESCRIPTION OF THE DRAWINGS

Embodiments of the present invention are illustrated by way of example, and not limitation, in the accompanying figures in which like references denote similar elements, and in which.

DETAILED DESCRIPTION

Figure 1:
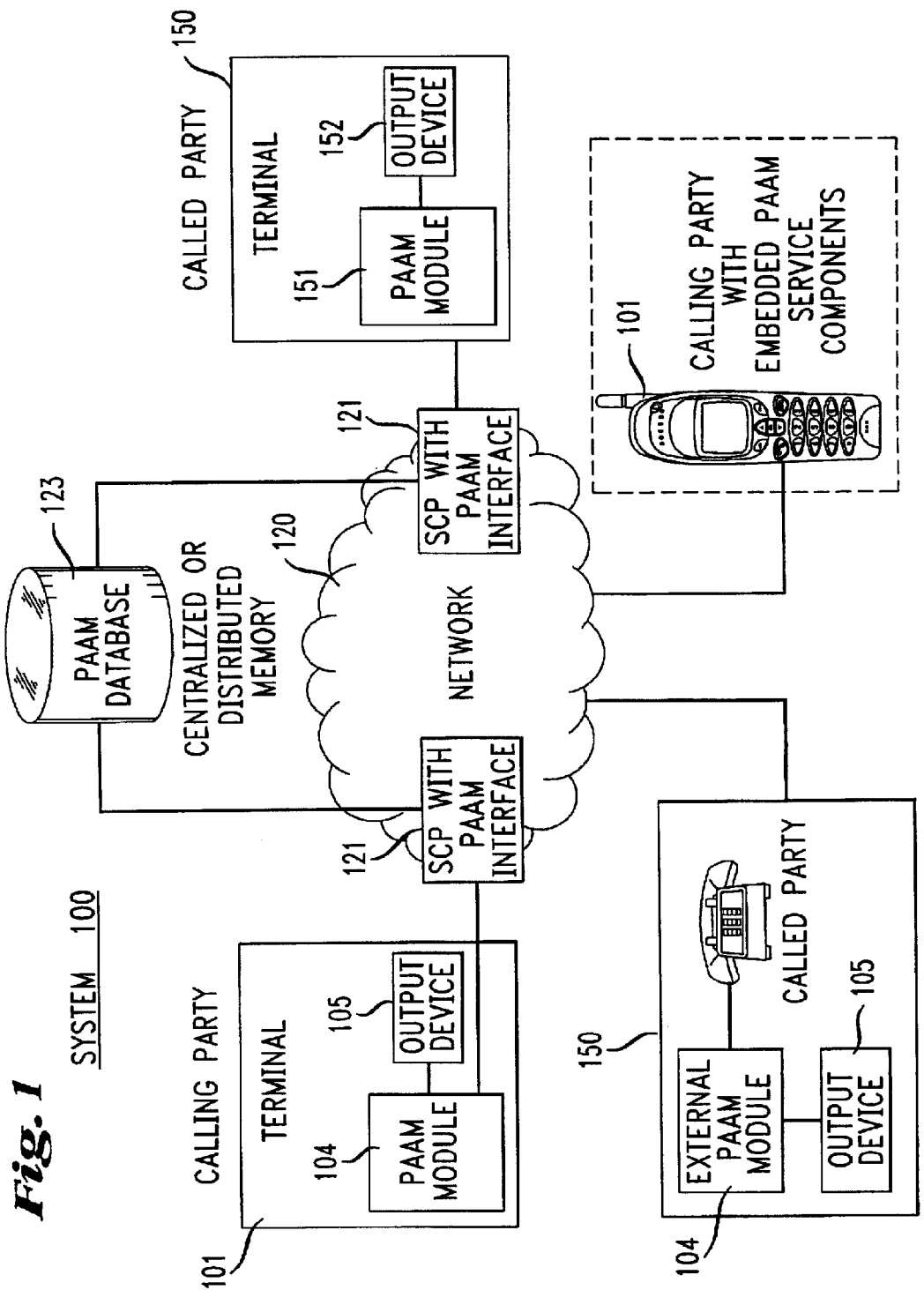
FIG. 1 is a personal audio alert messaging (PAAM) system diagram of a network-based application of a PAAM service in accordance with an embodiment of the present invention.

FIG. 1 shows a block diagram of personal audio alert messaging (PAAM) system 100 relating to a network-based application of the PAAM service in accordance with an embodiment of the present invention. The system 100 may include calling party terminal devices 101, called party terminal devices 150, and network 120.

Calling party terminal devices and called party terminal devices 101, 150, respectively, may include, for example, wired telephones, mobile telephones, personal computers (PCs), personal data assistants (PDAs), two-way audio-capable pagers, and/or other suitable devices. Calling party terminal device 101 may include PAAM module 104 that may be coupled to output device 105. Called party terminal device 150 may include PAAM module 151 that may be coupled to output device 152. PAAM modules 104, 151 may generate personal audio alerts that are perceived through output devices 105, 152. Output devices 105, 152 may be, for example, speakers, displays or other suitable devices for providing an output to the user.

Terminal devices 101, 150 may include additional components —for example, transmitters, receivers, input devices, output devices, application specific integrated circuits (ASICs), etc.—that are not shown for simplicity. It is recognized that suitable hardware and/or software may be included in these devices to provide PAAM service. PAAM functionality may be provided by components that may typically exist in such terminal devices —for example, processors, speakers, displays, etc. In embodiments of the present invention, PAAM components (e.g., components 104, 151, 105, 152) may be located external to the terminal devices or, alternatively, the PAAM components may be embedded within the terminal devices.

Network 120 may include, for example, a public switched telephone network (PSTN), a cellular network, the Internet, an intranet, a signaling system 7 (SS7) network, a local area network (LAN), a satellite network, an Advance Intelligent Network (AIN), any suitable digital or analog network, and/or any other suitable national and/or international communications network, and/or any suitable combination thereof.

Network 120 may include a plurality of signal control points (SCPs) 121 that may be distributed throughout network 120. SCP 121 may include an intelligent telecommunications switch. In embodiments of the present invention, SCPs 121 may include a PAAM interface that CD may receive PAAM information from the SCPs 121 and forwards the PAAM information to PAAM modules 104 and 151 to generate personal audio alerts through speakers 105, 152. In embodiments of the present invention, the PAAM module may include the PAAM interface. The PAAM module may sense that a call is being received on a communications line that is coupled to the network 120 and; upon sensing an incoming call, the PAAM module may initiate the PAAM service in, for called party device and/or the calling party device. The PAAM system 100 may further include memory device 123 for storing a PAAM database containing PAAM-specific information relating to the calling party and/or called party.

The PAAM database can be stored within a centralized or distributed memory 123 (also referred to herein as database 123) located internal or external to network 120. Database 123 may include PAAM information for users including, for example, phone number(s), billing information, whether the user is a subscriber of PAAM service, whether the PAAM service feature has been activated, billing information, etc. In addition, database 123 may include, for example, corresponding origination PAAM service information (O-PAAM), reverse PAAM service information (R-PAAM), and destination PAAM service information (D-PAAM) for each subscriber. Memory 123 may include a plurality of lists —for example, called party lists and/or calling party lists —that may include PAAM information for the called and/or called parties. The D-PAAM, O-PAAM, and/or R-PAAM messages may used instead of and/or in addition to the ringing tones that are generated towards the calling party and/or called party telephones in conventional telephone systems.

In an embodiment of the present invention, a PAAM subscriber's terminal device 101 may be identified as such by SCP 121 based on, for example, an incoming automatic number identifier (ANI). The incoming ANI may be compared with, for example, a telephone number that is stored in database 123. The stored telephone number may have corresponding information that indicates whether the caller is a subscriber of the PAAM service and/or whether the service has been activated for the particular device. Message strings such as O-PAAM, R-PAAM, and D-PAAM may populate additional fields in database 123. In embodiments of the present invention, O-PAAM, R-PAAM, and D-PAAM message strings may be defined and/or predefined by the calling party, called party, a third party, by computer generation and/or any combination thereof. The O-PAAM, R-PAAM, and D-PAAM message strings may be customized and/or personalized by the user, may be generic, may be selected by the user from a list of given choices or any combination thereof. Typically, D-PAAM strings are used as a greeting to a called party when, for example, an outgoing call is made and/or a call is being received. R-PAAM strings may be used typically to identify the called party and O-PAAM strings may be used to identify the calling party. It is recognized that the use of these message strings are given by way of example only and that the message strings may be used in different ways to achieve the advantages of the present invention.

In embodiments of the present invention, the D-PAAM message fields in PAAM service database 123 may indicate the manner in which the called party wants to be addressed when a call is in coming. Examples of personalized destination salutations may include, for example, "Miss Jennifer Jones," " John," "Mom," "Flash News," etc. Thus, a called party may hear the D-PAAM salutation prior to hearing, for example, the O-PAAM message (to be discussed below in more detail). It is recognized that the O-PAAM, D-PAAM, and R-PAAM messages may be presented as, for example, text on a display and/or as audio messages via a speaker.

In alternative embodiments, the called party may define a "rule set" using, for example, D-PAAM, R-PAAM and/or O-PAAM messages. The rule set may indicate how an incoming call should be handled and/or processed. For example, a D-PAAM message may define a particular number or identity of a calling party (or a group of numbers or calling parties) that should be blocked. For example, when the called party receives a call from the calling party whose call is to be blocked, the calling party may be presented with a message such as "the called party cannot be disturbed" any other suitable message. It is recognized that other types or rule sets and/or messages may be used to indicate how a particular call should be handled and/or processed.

In embodiments of the present invention, the called party may block calls indefinitely or may define a period or periods of time when the calls are to be blocked. For example, the called party may indicate that calls form a particular calling party are to be allowed Monday through Friday between 3:00–5:00 PM. Thus, if a call is received outside of the designated time period, the calling party may be notified, for example, that the call to the called party cannot be completed at this time and the message may offer alternative times when the call can be successfully completed. For example, the message may indicate that the calling party should call back during the designated time periods. Of course, the above D-PAAM messages and/or rules are given by way of example only and variation of such messages can be stored in the PAAM database and/or utilized in accordance with embodiments of the present invention.

The O-PAAM message fields may indicate how the calling party and/or the called party is to be announced to the other party. For example, a personal O-PAAM message in the calling party's record stored in the PAAM database may indicate how the calling party may be announced to the called party. Therefore, in this case, the O-PAAM message may indicate the identity of the calling party as may be defined by the calling party. Alternatively, an O-PAAM message in the called party's record in the PAAM database may indicate how the called party wants the system to announce the calling party. Therefore, in this case, the O-PAAM message may indicate the identity of the calling party as may be defined by the called party. If the calling party has an entry corresponding to the O-PAAM message string, the corresponding O-PAAM message is used to announce the calling party to the called party. For example, if the name "Henry Williams" corresponds to the O-PAAM string in the calling party's record in the database, the called party receives the announcement or message "Paul, Henry Williams is calling" (where "Paul" is a corresponding D-PAAM message). Other O-PAAM messages may include, for example, "Dad," "Mikey," "Alfred Moving Company," "BMW Dealership in Pikesville," etc. It is recognized that any O-PAAM message that indicates how the calling party is to be presented to the called party can be used. As used herein, the term announcement may refer to an audio announcement or may also refer to a text announcement that can be communicated using, for example, a display.

In embodiments of the invention, service or information providers such as weather, news, traffic update providers retail establishments, local utilities, and/or any other businesses or providers may provide automatic information updates to subscribers. For example, a weather service may create PAAM records for providing regular weather updates to subscribers. Thus, an O-PAAM message in the weather service record of the PAAM database can be sent to subscribers. Accordingly, a subscriber may receive a weather update, for example, "Weather Update: Partly cloudy, 72 degrees, 65% humidity" (where "Weather Update" is a D-PAAM message and "Partly cloudy, 72 degrees, 65% humidity" is an O-PAAM message). In alternative embodiments of the present invention, traffic updates, news updates, advertising, and/or other information can be sent to subscribers in accordance with embodiments of the present invention.

In embodiments of the present invention, the called party can indicate how she wants the system to announce the calling party. Thus, if a called party has an O-PAAM message field populated (i.e., has set the called party O-PAAM message) in the called party's record of her database, then the called party's O-PAAM can override the calling party's O-PAAM. In this case, when the called party receives a call from the calling party, the called party's O-PAAM message will be used to announce the calling party to the called, party instead of the calling party's O-PAAM message. In embodiments of the present invention, the called party and/or the calling party can indicate whether preference should be given to the O-PAAM messages from the called party's record or from the calling party's record in the PAAM database.

In embodiments of the present invention, the R-PAAM message field from the called party's record in the PAAM service database may indicate the manner in which the called party wants to be announced to the calling party. Therefore, in this case, the R-PAAM message may indicate the identity of the called party as may be defined by the called party. Examples of the R-PAAM messages from the called party's record include, for example, "Ms. Jennifer Jones," "Mr. John Smith," "Mom," John's Printing Co." etc. Thus, a calling party may hear "You are calling Ms. Jennifer Jones" while the call to Ms. Jones is being connected.

In alternative embodiments of the present invention, the R-PAAM message fields from the calling party's record in the database may indicate the manner in which the calling party wants the called party to be announced. Therefore, in this case, the R-PAAM message may indicate the identity of the called party as may be defined by the calling party. If the calling party has defined an R-PAAM message in her record, then the calling party's R-PAAM message may be used to indicate the identity of the calling party. Examples of R-PAAM messages include "Ms. Jones," "Mr. Smith," "Johns Printing Co.," etc. Thus, the calling party may hear "You are calling Ms. Jones" while the call is being connected. In embodiments of the present invention, the called party and/or the calling party may indicate whether preference should be given to R-PAAM messages from the called party's record or from the calling party's record in the PAAM database.

Table 1 below contains several examples illustrating the contents of calling party's records and called party's records as may be included in PAAM service database. As will be discussed below in more detail, the PAAM service database may be located in the network 120, may be located in called party and/or calling party terminal devices, and/or external to the terminal devices and/or in the network 120 and/or any combination thereof. The PAAM service database may be a centralized database such as PAAM database 123 or may be a distributed database located throughout the network 120 and/or internal to or external to the various terminal devices. In Examples 1–4 shown in Table 1 and described below, the calling party's record may include, for example, the identity of the calling party, calling party's number, a called party's ID, and personal D-PAAM, personal O-PAAM and personal R-PAAM for the calling party. The called party's record may include, for example, the identity of the called party, called party's number, a calling party's ID, and personal D-PAAM, personal O-PAAM and personal R-PAAM for the called party.

TABLE 1

| Calling Party's Record | Called Party's Record |
|---|---|
| Example 1 | |
| Calling Party: Mr. Jimmy Smith | Called Party: Mr. Paul Jones |
| Calling Party No.: 425-555-1212 | Called Party No.: 425-555-1213 |
| Called Party ID: 425-555-1213 | Calling Party ID: 425-555-1212 |
| D-PAAM: Jimmy | D-PAAM: Paul |
| O-PAAM: Jimmy Smith | O-PAAM: (not defined) |
| R-RAAM: Paul Jones | R-RAAM: Mr. Jones |
| Example 2 | |
| Calling Party: Mr. Jimmy Smith | Called Party: Mr. Paul Jones |
| Calling Party No.: 425-555-1212 | Called Party No.: 425-555-1213 |
| Called Party ID: 425-555-1213 | Calling Party ID: 425-555-1212 |
| D-PAAM: Jimmy | D-PAAM: Paul |
| O-PAAM: Vice President of Sales | O-PAAM: Mr. Smith |
| R-RAAM: (not defined) | R-RAAM: Mr. Jones |
| Example 3 | |
| Calling Party: Traffic Alert Service | Called Party: Mr. Paul Jones |
| Called Party ID: 425-555-1213 | Calling Party No.: 425-555-1213 |
| D-PAAM: (not defined) | Calling Party ID: Traffic Alert Service |
| O-PAAM: "Traffic Alert: I-5 southbound Exit 22, accident left lane closed, expect delays" | D-PAAM: Traffic update for evening drive home |
| R-PAAM: (not defined) | O-PAAM: (not defined) |
| | R-PAAM: (not defined) |
| Example 4 | |
| Calling Party: Department Store XYZ | Called Party: Mr. Paul Jones |
| Called Party No.: 425-555-1213 | Calling Party No.: 425-555-1213 |
| D-PAAM: (not defined) | Calling Party ID: Department Store XYZ |
| O-PAAM: "Clearance Sales! 50% off all merchandise" | D-PAAM: Calls allowed: M–F 3:00–5:00 PM |
| R-PAAM: (not defined) | O-PAAM: (not defined) |
| | R-PAAM: (not defined) |

Based on the calling party's record in Example 1, a calling party placing a call to a called party may hear, for example, "You are calling Paul Jones." In this example, the identity of the called party is determined by an identifier such as a Called Party ID (i.e., Called Party No.: 425–555-1213) and the corresponding R-PAAM included in the calling party's record. At the other end, the called party receiving the call may hear "Paul, Jimmy Smith is calling." In this case, the D-PAAM (i.e., Paul) from the called party's record and the O-PAAM (i.e., Jimmy Smith) from the calling party's record is used to create message(s) that the called party may be presented with. An "identifier" as used herein may describe the calling party and/or called party and may include a telephone number, customer identifier (ID), an individual name, a company or organization name, or any other such information that may identify the calling and/or called parties.

Referring to Example 2 in Table 1 above, a calling party placing a call to a called party may hear "You are calling Mr. Jones." In this example, since the R-PAAM in the calling party's record is not defined, the R-PAAM (i.e., Mr. Jones) in the called party's record is used to identify the called party to the calling party. At the other end, the called party receiving the call may hear "Paul, Mr. Smith is calling." In this case, the D-PAAM (i.e. Paul) and the O-PAAM (i.e. Mr. Smith) from the called party's record are used to create the announcement the called party may be presented with. In this case, the O-PAAM from the called party's record (i.e., Mr. Smith) may be used since the O-PAAM is defined in the called party's records. In alternative embodiments of the present invention, the O-PAAM from the calling party's record (i.e., Vice President of Sales) may be used to identify the calling party to the called party.

In yet further alternative embodiments of the present invention, if both parties have a ad particular message field defined, then priority levels may be established for corresponding PAAM message fields to indicate whether, for example, the corresponding field from the called party's list or the calling party's list should be used in the announcement message. In other words, both called and calling parties may assign priorities to their respective message fields, and if both parties have a particular field such as O-PAAM message field defined, the message with, for example, the highest priority may be used in the announcement message. In cases where both parties have similar priority levels assigned to the same message field, one message field may be randomly selected. Alternatively, preference may be given to the message field included in the calling list of the individual actually receiving the message announcement. In other words, where both parties have, for example, the O-PAAM message field defined, then the O-PAAM from the called party's list may be used when announcing the calling party to the called party. It is recognized that other techniques may be used to select the message fields when a message announcement is made.

Examples 3 and 4 in Table 1 above, illustrate the use of the PAAM service in providing information updates to subscribers. In Example 3, the calling party may be a Traffic Alert Service that automatically provides regular traffic updates for predetermined traffic routes or for general traffic conditions desired by the subscriber. After the service initiates the call to the subscriber, the subscriber (i.e., the called party) is presented with the D-PAAM message "Traffic update for evening drive home" from the called party's record. After the D-PAAM message is presented, the subscriber is presented with the O-PAAM message "Traffic Alert: I-5 southbound Exit 22, accident left lane closed, expect delays" from the calling party's update. Accordingly, the subscriber is provided with, for example, traffic updates in accordance with embodiments of the present invention. It is recognized that other information updates —for example, news updates, stock quotes, sport scores, etc.—can be provided using the PAAM service in accordance with embodiments of the present invention. It is recognized that the information updates and/or messages described above may be predefined and stored in the database and/or may be dynamically generated and presented in real time to the called and/or calling parties.

Example 4 in Table 1 illustrates the use of D-PAAM messages to define a "rule set" that indicates how the incoming call is to be handled. For example, the D-PAAM message indicates when calls from a particular calling party are permitted. Thus, as indicated in Example 4, the subscriber indicates in the called party's record that calls are allowed from Department Store XYZ (i.e., Calling Party ID: Department Store XYZ) Monday through Friday between 3:00 PM and 5:00 PM (i.e., D-PAAM: Calls allowed: M–F 3:00–5:00 PM). Thus, if a call is received from the calling party at 3:30 PM on a Friday, the called party is presented with the O-PAAM message from called party that states "Clearance Sales! 1 50% off all merchandise." Alternatively, if a call is received from the calling party at 1:00 PM on Friday, the call is blocked. In embodiments of the present invention, the calling party can be presented with a message, for example, "The called party cannot be disturbed."

The D-PAAM, O-PAAM and R-PAAM messages given above are given by way of example only and a variety of different combinations of D-PAAM, O-PAAM, R-PAAM messages can be used in a variety of ways in accordance with embodiments of the present invention. For example, additional information may be added to the D-PAAM, O-PAAM, and/or R-PAAM message strings. The additional information may include other messages such as "Please wait while your call is being connected" or "Here are the head lines for this evening . . . "or "The current temperature in New York is . . . " and/or other suitable information. It is recognized that sports scores, weather updates, times, lottery numbers, news, etc. may be provided using the various PAAM message strings. Such information may be dynamically generated, and/or added or updated by PAAM module and/or interface. The additional information may be added before or after the D-PAAM, O-PAAM and R-PAAM message strings.

Additional fields in the database may include, for example, fields indicating whether the PAAM service feature is allowed for the corresponding calling and/or called party subscriber, whether the PAAM feature is active for the corresponding calling and/or called party subscriber, priority levels for corresponding message fields, and/or a list of screened or allowed callers/callees for whom PAAM service information is permitted. In embodiments of the invention, called and/or calling parties may create additional fields that may indicate how to handle calls from non-subscribers and or users that are not in any of the personalized lists. For example, these fields may store generic PAAM information messages that may be presented to users who do not subscribe to the PAAM service in accordance with embodiments of the present invention. In embodiments of the present invention, the PAAM module may generate the generic messages and store the generic messages in the database or, alternatively, the PAAM module may dynamically generate the generic messages and present them to the calling and/or called parties.

In embodiments of the present invention, a PAAM service subscriber may create a plurality of different personal PAAM lists that indicate the manner in which to handle, for example, incoming and/or outgoing calls. These lists may include, for example, a list of family members, a list of friends, a list of associates, a personal list, a frequent contacts list, a client its list, a vendor list, and/or a plurality of group lists. Each list may include one or more personal identification numbers (PINs) or user names that may identify each subscriber as well as individuals whose names are stored in the database. These PINS may, for example, permit access to the database so that subscribers as well as other individuals can amend the database contents as needed. These PINs may be created when individual names are entered in the database or at a later time. The personal lists may be stored in the PAAM service database and may include a line identification number (LIN) (e.g., telephone numbers) for identifying, for example, called and/or calling parties. These line identification numbers may include, for example, automatic number identification (ANI), mobile identification number (MIN), caller identification number (caller ID), and/or direct inward dialing (DID) number. Corresponding to these line identification numbers, these personalized lists may include personalized and/or generic D-PAAM, O-PAAM and R-PAAM information.

Figure 2:
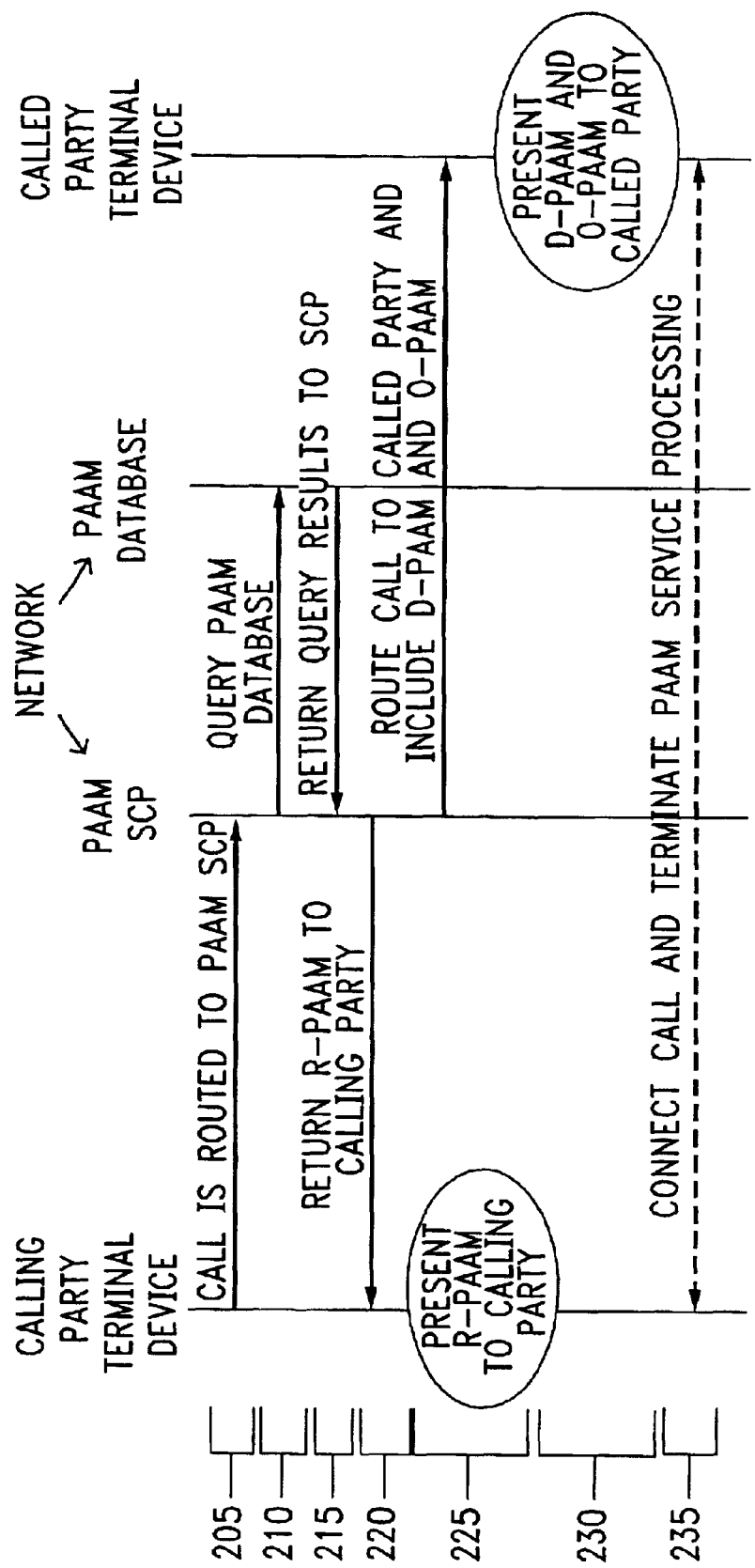
FIG. 2 is a call flow diagram illustrating the operation of the PAAM service in accordance with an embodiment of the present invention.

FIG. 2 is a call flow diagram illustrating the operation of a network-based PAAM service (as shown in FIG. 1) in accordance with an embodiment of the present invention. As shown in FIG. 2, a calling party uses terminal device 101 to place a call to called party terminal device 150 and the call is routed to PAAM enabled SCP 121 (205). The PAAM enabled SCP 121 may query database 123 to determine how the incoming call should be handled (210). SCP 121 may query database 123 to determine whether the calling party a nd the called party are subscribers of the PAAM service and whether the service has been activated. The SCP may use a calling party identifier, for example, a calling party's ANI, the called party's number, name, address, or other information to look up the records for the calling party and/or the called party in the PAAM database 123. The existence of such records may indicate whether each party is a subscriber of the PAAM service. In embodiments of the invention, if the calling and/or called party are not subscribers of the PAAM service, then the call may be processed without PAM service processing. In alternative embodiments of the present invention, if one or the other party is not a subscriber, one or more generic message strings and/or a mess age announcement may be generated by, for example, the PAAM modules 104, 151 and presented to the called and/or calling party via their respective device outputs 105, 152. In alternative embodiments of the present invention, SCP 121 may generate the one or more generic message strings and/or the message announcement. The SCP 121 may for ward the generic message strings and/or the message announcement to the PAAM modules 104, 105 to be output via device outputs 105, 152.

If the parties are determined to be subscribers, the results of the query (e.g., corresponding R-PAAM, O-PAAM, and D-PAAM information from the database) are returned to SCP 121 (215). SCP 121 returns the R-PAAM to the calling party (220). If the R-PAAM is defined in the calling party's record, the R-PAAM form the calling party's record is returned to the calling party. Alternatively, the R-PAAM from the called party's record can be returned to the calling party.

SCP 121 routes the call to the called party, and includes the appropriate D-PAAM and O-PAAM information destined for the called party terminal 150 (225). While the call is being processed, the R-PAAM information is presented to the calling party via terminal device 101 (225). The R-PAAM information may be an audio message output by a speaker indicating that the calling party is attempting to communicate with the called party, for example, "You are calling Paul Jones." Optionally or additionally, the R-PAAM information may be presented as a text message to the calling party via a terminal device display. The called party may receive the O-PAAM and D-PAAM information at her called party terminal 150 (230). The O-PAAM and D-PAAM information may be an audio or text message, for example, "Paul, Jimmy Smith is calling." The called party may simply answer or accept the call in which case the call is connected and the PAAM service is terminated (235).

In alternative embodiments of the invention, the called party may respond to the incoming call by sending an additional R-PAAM message (or status message) directed towards the calling party terminal device 101. The additional R-PAAM message may be a response to indicate the status or disposition of the pending call as determined by, for example, the called party, the network, and/or a third party. By verbal command(s) and/or pre-programmed key entries on terminal device 150, the called party may respond to the incoming call with an indication such as call accepted, call rejected, call busy, out of the office, call waiting, no answer, connecting to voice-mail, forwarding the call to a third party, etc. The called party's response to the incoming call is returned to SCP 121. Based on the called party's response, the SCP 121 retrieves additional R-PAAM information from a common record in the PAAM database and forwards the additional R-PAAM information to the calling party terminal device 101. A common record may be a portion of the PAAM database that may be shared by both the calling party and the called party, for example. The additional R-PAAM information may be delivered to the calling party terminal 101 and the calling party may hear an audio message or see a textual representation of the additional R-PAAM information. If the called party accepts the call, the call between the calling party and the called party may be connected and the PAAM service may be terminated. In the event the called party decides not to answer the calling party call, the call and the PAAM service may be terminated.

In embodiments of the present invention, the additional R-PAAM messages may include, for example, "Call Accepted," "Call Rejected," "Call Busy," "Out of the office," "Please hold," "No answer," "Connecting to voice-mail," etc. The R-PAAM messages may be stored in a common record in the PAAM service database that can be shared by PAAM service subscribers. The additional R-PAAM messages are given by way of example only and it is recognized that any message that indicates the status of the call to the calling party can be used. In embodiments of the present invention, the D-PAAM messages, for example, from the calling party's record may be combined with additional R-PAAM messages to present a personalized message indicating the status of the pending call to the called party. For example, a personalized message to the calling party may state "Jimmy, connecting to voice-mail" or "Jimmy, call accepted, please hold."

Figure 3:
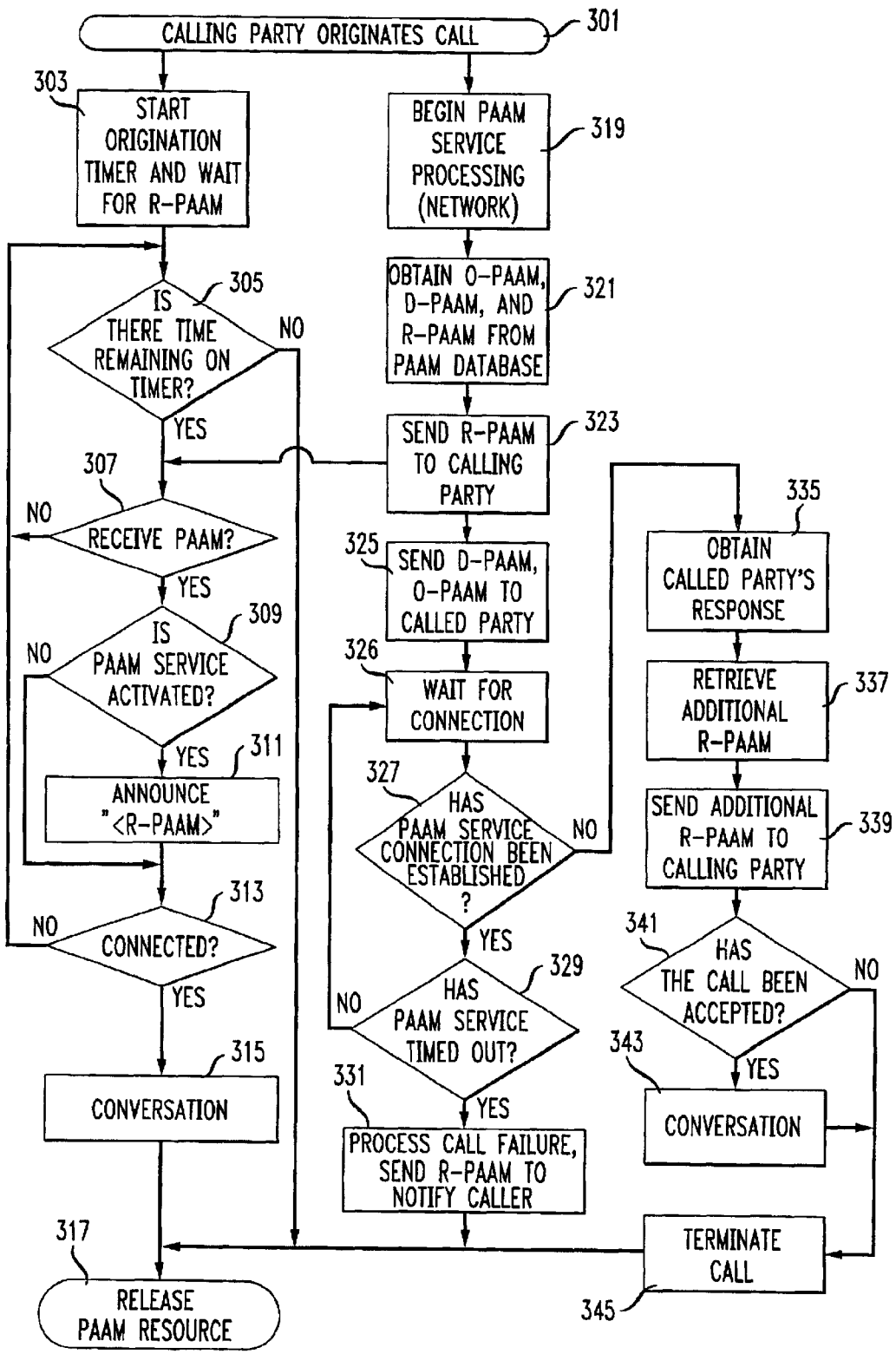
FIG. 3 is a flow chart illustrating the operation of the PAAM service in accordance with an embodiment of the present invention.

FIG. 3 is a flow chart describing in more detail an exemplary embodiment of the operation of a network-based PAAM service described in FIGS. 1 and 2. It is recognized that the operation described below with respect to FIG. 3 is given by way of example only and one of ordinary skill in the art can employ other techniques in accordance with embodiments of the present invention. The calling party who is a subscriber of the PAAM service originates a call (301). The PAAM service is activated and parallel processes beginning with steps 303 and 319 are started.

In an embodiment of the invention, at the call origination side, the calling party terminal 101 may start an origination timer for receiving R-PAAM information (303). If R-PAAM information is received during the given amount of time and the PAAM service is activated at the calling party terminal 101, the calling party may receive the message, for example, "You are calling Paul Jones" (305–311). Once the call to the called party is connected and the conversation commences, the PAAM resources may be released (313–317). If in step 313 the call has not been connected, then the process may be restarted from step 305.

If, however, the timer times out, then the PAAM resources may be released (305 and 317). In this event, the call may proceed without the PAAM service or the call may be terminated in its entirety.

In step 307, if R-PAAM information is not received, then the system returns back to step 305 to determine whether time remains on the origination timer and the process is restarted.

If R-PAAM information has been received (307) but the PAAM service has not been activated (309), then the conversation can commence after the call has been connected (313–315). If in step 313, the call has not been connected, then the process may be restarted from step 305.

Returning back to step 319, after the calling party originates the call, SCP 121 begins PAAM service processing according to an embodiment of the present invention. SCP 121 retrieves O-PAAM, D-PAAM, and R-PAAM information from the network database 123 (321). SCP 121 sends R-PAAM information to the calling party and the D-PAAM and the O-PAAM information to the called party (323–325). The SCP 121 waits for the call to be connected (326). Once the call is established, SCP 121 determines whether a PAAM service connection has been established with the called party (327). The PAAM service connection may be, for example, a one-way connection that is established to facilitate O-PAAM and/or D-PAAM information transmissions at the called party terminal device 150.

If in step 327 the PAAM service connection has not been established, and a connection timer has timed out (329), SCP 121 may send a R-PAAM to indicate a call connection failure to the calling party and the PAAM resources may be released (331 and 317). If in step 327 the PAAM service connection has not been established, but the connection timer has not timed out (329), the process may return to step 326 to wait for the call to be connected.

If in step 327 the PAAM service connection has been established and the O-PAAM and D-PAAM information have been presented to the called party, the PAAM module 151 or SCP may obtain a response from the called party (335). The called party response may indicate whether the incoming call is, for example, accepted, rejected, busy, unanswered, etc. In embodiments of the present invention, either the SCP 121 or PAAM module 151 may retrieve additional R-PAAM information based on the called party response from a common record in PAAM database 123 (337). The generated R-PAAM information may be forwarded to the calling party terminal device 101 and if the call has been accepted, the conversation may commence (339–343). Once the conversation has commenced, the PAAM service resources may be released (317). If in step 341, the call has not been accepted (i.e., because the called at party does not accept, is busy, is not available, etc.), the call may be terminated and the PAAM service resources may be released (345 and 317).

Figure 4:
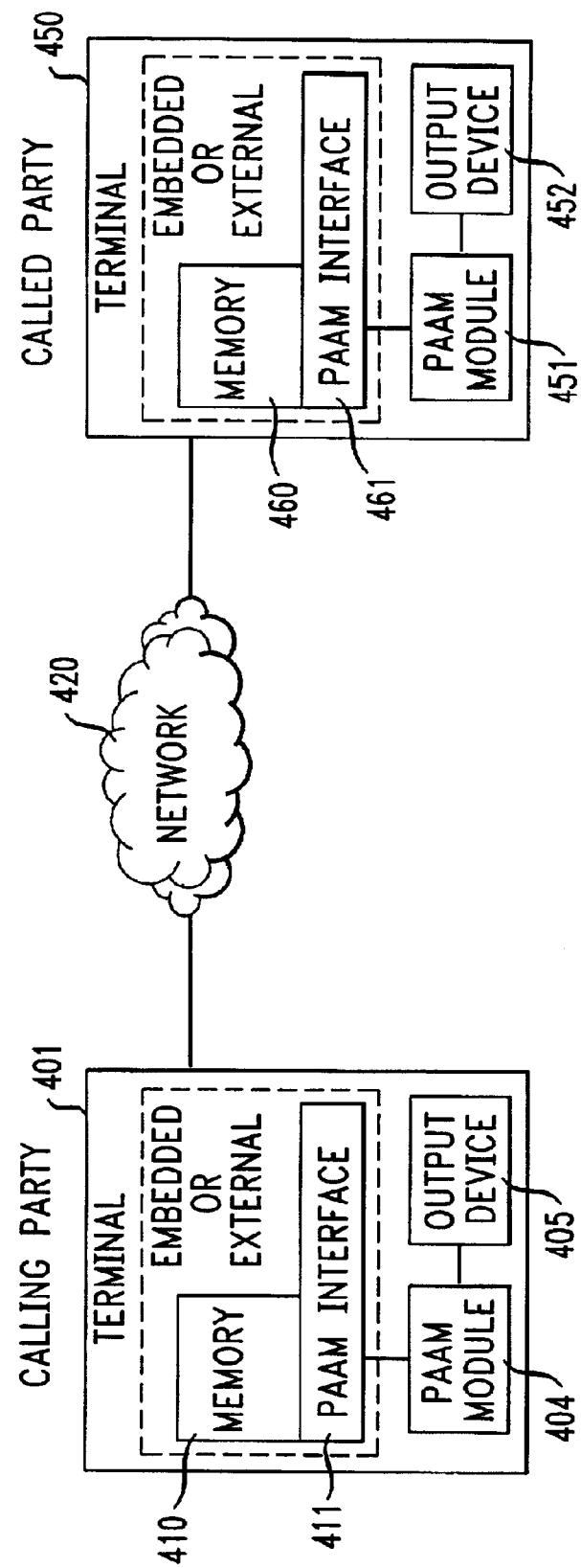
FIG. 4 is a PAAM system diagram of a terminal-based application of the PAAM service in accordance with an embodiment of the present invention.

FIG. 4 shows an alternative embodiment of the present invention. FIG. 4 shows a system 400 relating to a terminal-based implementation of the PAAM service. In this embodiment, a personal PAAM database and a PAAM interface may be located at the calling party and/or called party ends. Calling party terminal device 401 and called party terminal device 450 may include memory 410, 460 for storing personal PAAM database and other information, PAAM interface modules 411, 461, PAAM module 404, 451, and output device 405, 452. In embodiments of the invention, these components (e.g., memory 410, 460, PAAM interface 411, 461, PAAM module 404, 451, and output device 405, 452) may be embedded within the terminal device, may be external to the terminal device, and/or any combination thereof. It is recognized that this embodiment includes all suitable features of the earlier embodiments. Where appropriate, the components—for example, the PAAM module, output device, PAAM interface, etc.—shown in FIG. 4 may operate in the same manner as similar components shown in FIG. 1 and described above.

PAAM database stored in memory 410 may include R-PAAM information that is presented to the calling party. PAAM database stored in memory 460, for example, may include O-PAAM and D-PAAM information that is presented to the called party. PAAM databases stored in memory 410, 460 may include additional information similar to the information stored in PAAM database 123.

PAAM interface modules may be coupled to memory as well as to the PAAM modules. PAAM interface modules 411, 461 may retrieve corresponding PAAM information from the PAAM database stored in memory 410, 460, respectively (hereinafter referred to as PAAM database 410 and 460). The PAAM interface modules 411, 461 may interact with the PAAM modules 404, 451, respectively, to operate the PAAM service in accordance with embodiments of the present invention. PAAM modules 404, 451 are similar to PAAM modules 104, 151 and output devices 404, 452 are similar to output devices 105, 152. Network 420 is similar to network 120 shown if FIG. 1.

Figure 5:
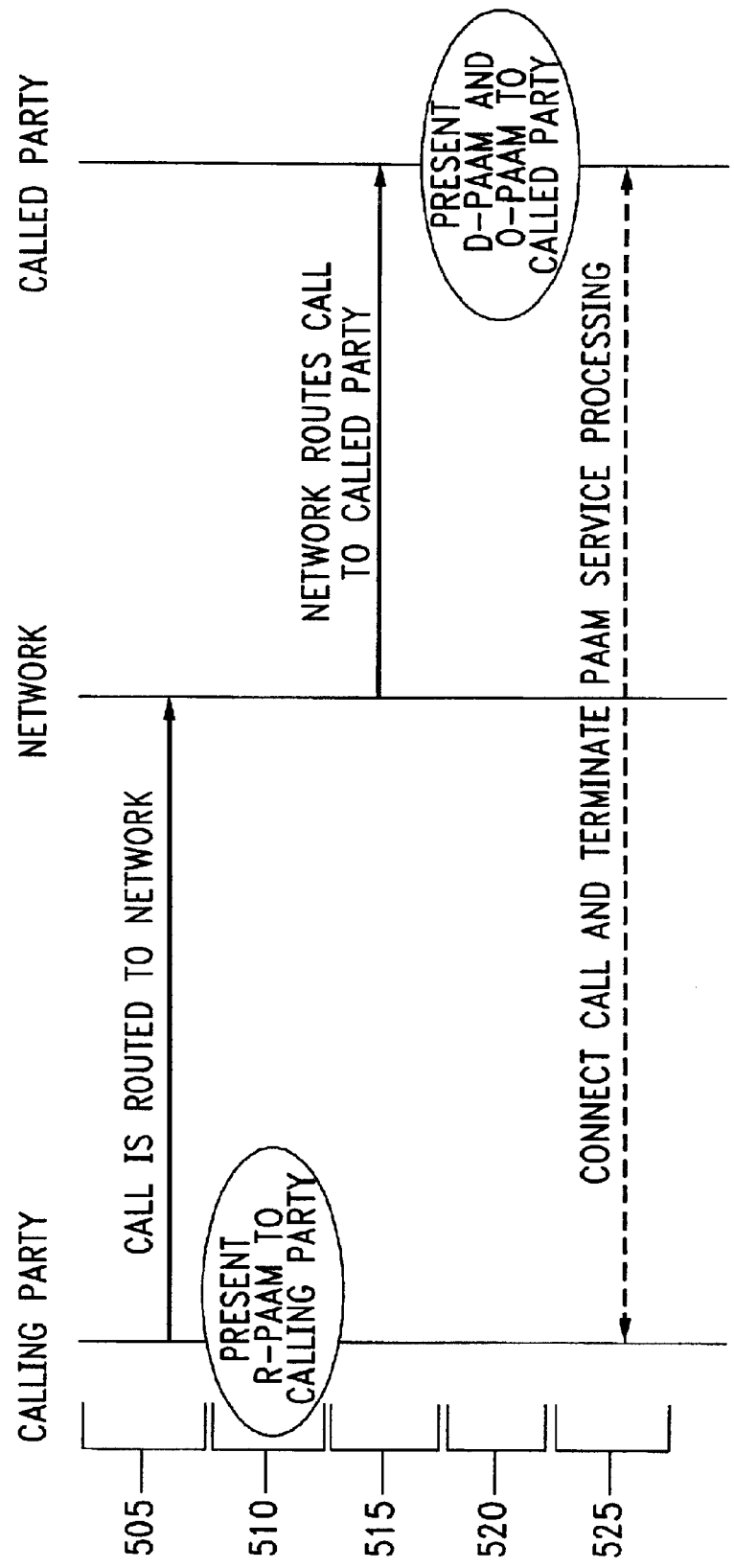
FIG. 5 is a call flow diagram illustrating the operation of the PAAM service in accordance with an embodiment of the present invention.

FIG. 5 is a call flow diagram illustrating the operation of terminal-based PAAM service (as shown in FIG. 4) in accordance with an exemplary embodiment of the present invention. The calling party originates a call to the called party from terminal device 401 and the call is routed to the network 420 (505). The PAAM interface 411 may look up the called party number in PAAM database 410 to determine whether the called party has the PAAM service enabled. If the called party has the PAAM service enabled, the PAAM module may present an audio or text R-PAAM message to the calling party via the output device 405 (510). For example, the calling party may hear, "You are calling Paul Jones" or "You care calling your husband." If the name of the called party or a personalized announcement is not present in PAAM database 410, a generic message may be presented to the calling party. The generic message may be, for example, "You are calling telephone no. 425-555-1213." In embodiments of the present invention, the generic message may include a prerecorded message, for example, "You are calling" or "You are receiving a call from" and a called party and/or calling party telephone number. The prerecorded message may be in the voice of the called party, calling party, a computer-generated voice and/or a third party. In alternative embodiments, an ANI lookup may be used to identify the identity of the called party based on the dialed number and may present the name of the called party based on the ANI lookup.

Concurrent with step 510, the network 420 routes the call to the called party (515). After the called party receives the call, the PAAM interface 461 may look up the calling party's number in local PAAM database 460. If the calling party number is found in local PAAM database 460, the PAAM module presents O-PAAM and/or D-PAAM messages to the called party via the output device 452 (520). For example, the called party may hear "Paul, Jimmy Smith is calling" or "Paul, your wife is calling." If the name of the called party or a personalized announcement is not present in PAAM database 460, a generic message may be presented to the called party. The generic message may be, for example, "Paul, you are receiving a call from 425-555-1212." In alternative embodiments, an ANI lookup may be used to identify the identity of the calling party based on the incoming calling party number. Based on the ANI lookup, the identity of the calling party may be presented to the called party. If the call is accepted, the call is connected and the calling party and called party can begin the conversation (525). After the call is connected, the PAAM service processing is terminated.

Figure 6:
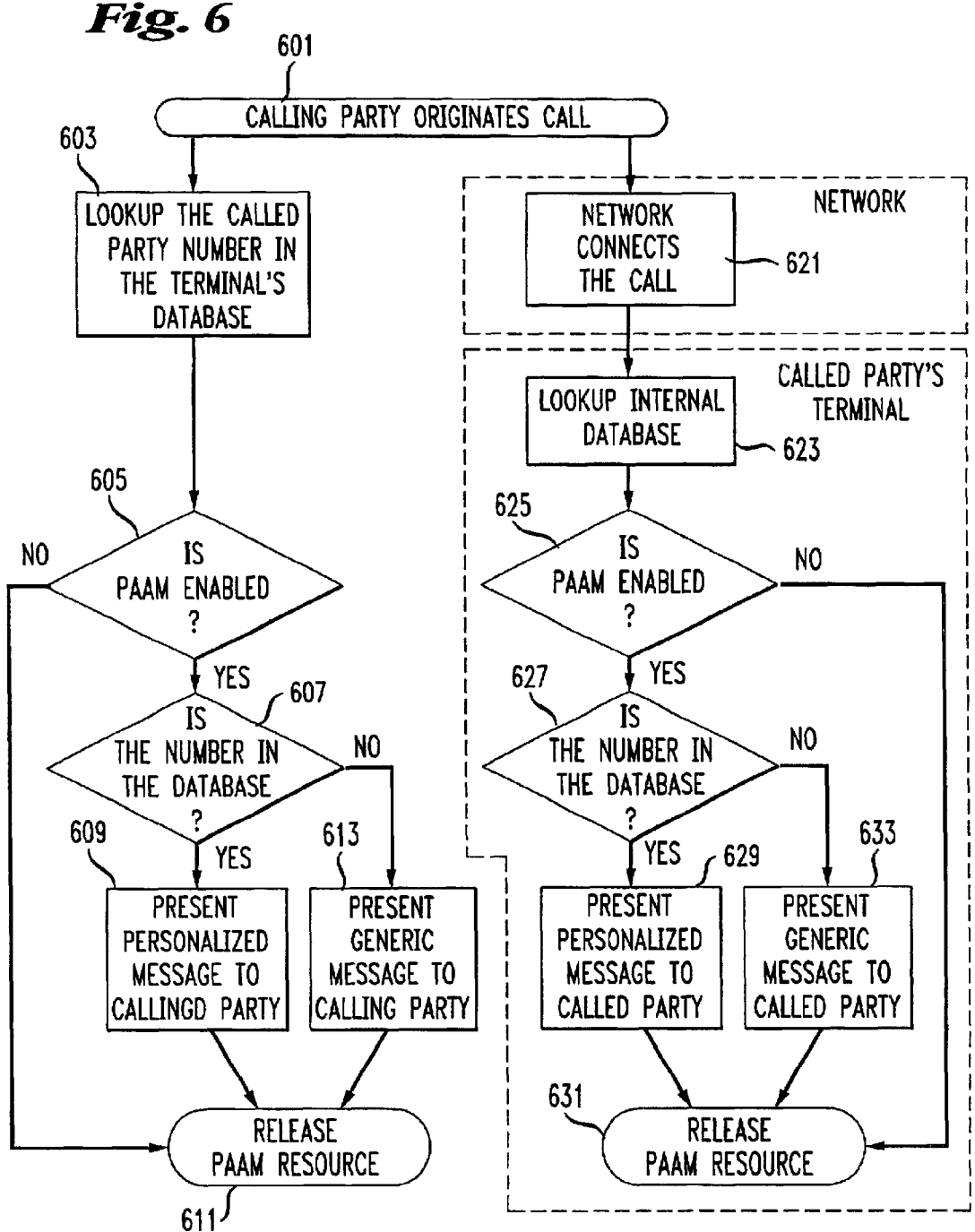
FIG. 6 is a flow chart illustrating the operation of the PAAM service in accordance with an embodiment of the present invention.

FIG. 6 is a flow chart describing in more detail an exemplary embodiment of the operation of a terminal-based PAAM service described in FIGS. 4 and 5. It is recognized that the operation described below with respect to FIG. 6 is given by way of example only and one of ordinary skill in the art can employ other techniques in accordance with embodiments of the present invention. The calling party who is a subscriber of the PAAM service originates a call (601). In embodiments of the present invention, the terminal-based PAAM service is activated and process steps 603 and 621 may begin in parallel.

The called party number may be looked up in local PAAM database 410 to determine whether the called party and/or calling party has the PAAM service enabled (603–605). If the called party and/or calling party does not have the terminal-based PAAM service enabled, the PAAM resources may be released (611). If the called party and/or calling party has the PAAM service enabled and the called party number appears in the local PAAM database 410, then the calling party is presented with a personalized R-PAAM message from the local PAAM database 410 and the local PAAM resources may be released (607–611).

If In step 607 the called party number and corresponding information are not in the local database 410, the calling party may be presented with a generic R-PAAM message from the local PAAM database 410 and the PAAM resources may be released (613 and 611).

In embodiments of the present invention, for example, concurrent with step 603, the network 420 connects the desired call by the calling party to the called party (621). After the called party receives the call, the internal or local PAAM database 460 may be accessed (623). If the terminal-based PAAM service is not enabled, the PAAM resources may be released (625 and 631). If the called party has the PAAM service enabled and the calling party number appears in the internal PAAM database, then the called party is presented with a personalized D-PAAM and O-PAAM messages and the local PAAM resources may be released once the call is connected (627–631).

If, in step 627, the calling party number and corresponding information are not in the local database 460, the called party may be presented with a generic message and the PAAM resources may be released after the call is connected (633 and 631).

Figure 7:
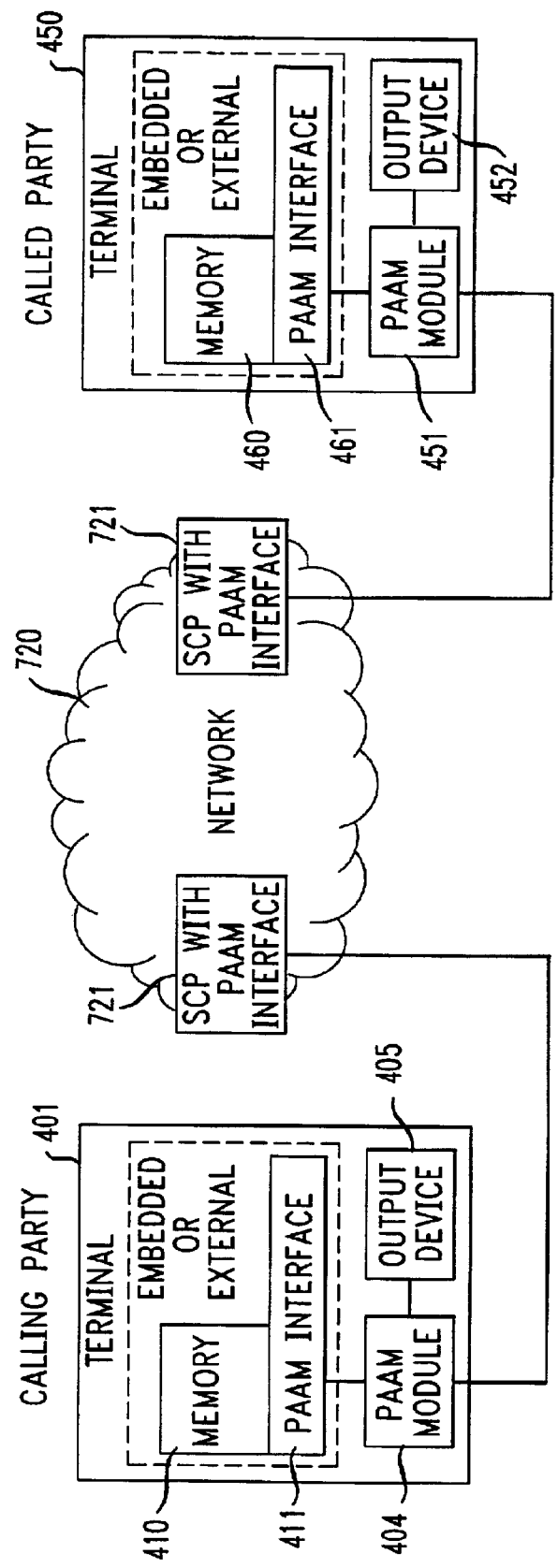
FIG. 7 is a PAAM system diagram of a network/terminal-based application of the PAAM service in accordance with an embodiment of the present invention.

FIG. 7 shows yet another alternative embodiment of the present invention. FIG. 7 shows a system 700 relating to a hybrid implementation of the PAAM service. In system 700, calling a party terminal 401 and called party terminal 450 may communicate with network 720. Network 720 may be similar to network 120 and 440 shown in FIGS. 1 and 4, respectively. Network 720 do may include SCP 721 having a PAAM interface to provide PAAM service connections in accordance with embodiments of the present invention. Where appropriate, the components —for example, the PAAM module, output device, PAAM interface, etc.— shown in FIG. 7 may operate in the same manner as similar components shown in FIGS. 1 and 2 and described above.

Figure 8:
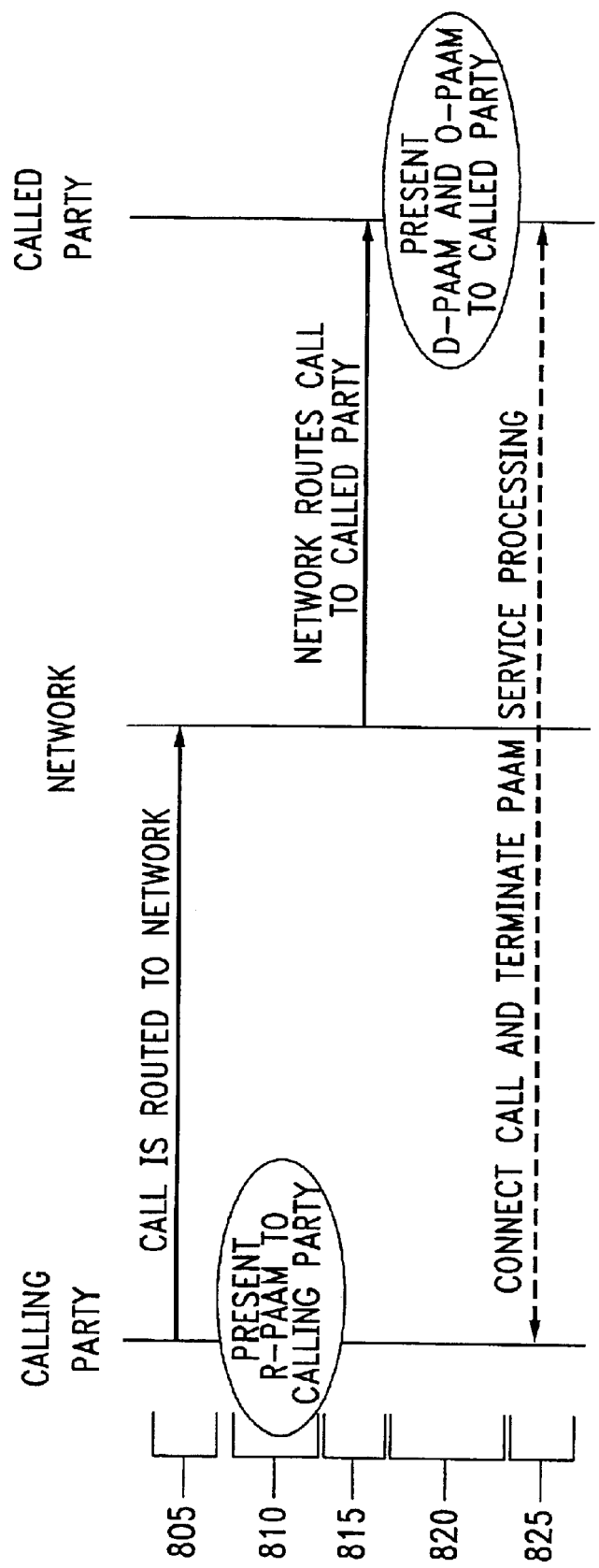
FIG. 8 is a call flow diagram illustrating the operation of the PAAM service in accordance with an embodiment of the present invention.

FIG. 8 is a call flow diagram illustrating the operation of a hybrid network/terminal-based PAAM service (as shown in FIG. 7) in accordance with an embodiment of the present invention. The calling party originates a call to the called party and the call is routed to the network 720 (805). The originating call signals may include an O-PAAM message that is sent to the network 720. In the alternative, the SCP 721 may retrieve an O-PAAM message from a PAAM database (not shown) located in the network. PAAM interface 411 may look up the called party number in PAAM database 410 to determine whether the called party has the PAAM service enabled. If the called party has the PAAM service is enabled, the PAAM module presents the stored R-PAAM message to the calling party via the output device 405 (810).

Concurrent with step 810, the network 720 may connect the desired call by the calling party to the called party and the network SCP 721 may pass an O-PAAM message to the called party (815). After the called party receives the call, the PAAM interface 461 may look up the calling party's number in local database 460. If the calling party number is found in local PAAM database 460, the PAAM module 451 retrieves the stored D-PAAM message from the called party's record stored in PAAM database 460. The PAAM module 451 combines the D-PAAM from the local database 460 and O-PAAM received from the network. The combined message is presented to the called party via the output device 452 (820). For example, the combined message "Paul, Jimmy Smith is calling" is presented to the called party. If the call is accepted, the call is connected and the calling party and called party can begin the conversation (840).

In alternative embodiments of the invention, the called party may respond to the incoming call by sending additional R-PAAM information directed towards the calling party terminal device 401. By verbal command(s) and/or pre-programmed key entries on terminal device 450, the called party may respond to the incoming call with an indication, for example, call accepted, call rejected, call busy, out of the office, call waiting, no answer, connecting to voice-mail, etc. Based on the response by the called party, additional R-PAAM information may be sent to the network. In embodiments of the invention, for example, key entries correspond to the additional R-PAAM messages for indicating the status of the pending call to the calling party. After a match for a key entry has been found in the local PAAM database 460, the corresponding R-PAAM information is sent to the network (825). In alternative embodiments of the present Invention, corresponding R-PAAM Information may be stored In a database that is located external to the called party terminal device 450, for example, in network 420.

In embodiments of the present invention, SCP 721 within network 720 may forward the additional R-PAAM information to the calling party terminal device 401. The additional R-PAAM information is delivered to the calling party terminal 401 and the calling party may hear an audio message or see a textual representation of the additional R-PAAM information. If the called party accepts the call, the call between the calling party and the called party is connected and the PAAM service is be terminated. In the event the called party decides not to answer the calling party call, the call and the PAAM service may be terminated.

Figure 9:
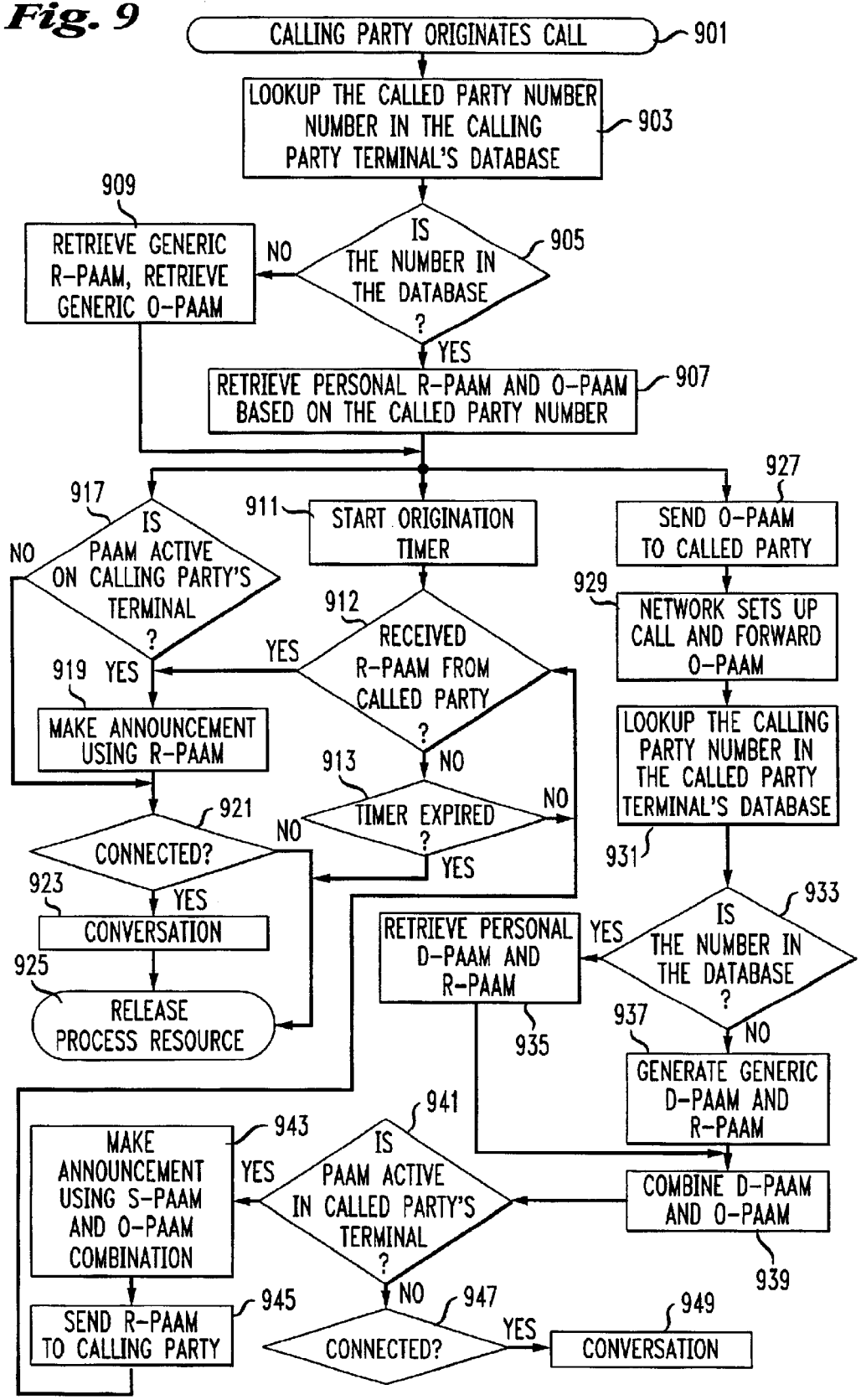
FIG. 9 is a flow chart illustrating the operation of the PAAM service in accordance with an embodiment of the present invention.

FIG. 9 is a flow chart describing in more detail the operation of the hybrid PAAM service described in FIGS. 7 and 8, in accordance with an exemplary embodiment of the present invention. It is recognized that the operation described below with respect to FIG. 9 is given by way of example only and one of ordinary skill in the art can employ other techniques in accordance with embodiments of the present invention. After the calling party originates the call, the PAAM database 410 may be accessed to determine whether the called party number is stored in the PAAM database 410 (901–905). If the called party number appears in the local PAAM database 410, then the personal R-PAAM and O-PAAM may be retrieved from the database based on the called party number (907).

If, in step 905, the called party number and corresponding information are not in the local PAAM database 410, then generic R-PAAM and O-PAAM information may be retrieved from the local PAAM database 410 (909).

Once the appropriate R-PAAM and O-PAAM information is retrieved, process steps 911, 917, and 927 may begin in parallel. If PAAM is active on the calling party terminal 401, then the calling party may be presented with either a personalized R-PAAM message or a generic R-PAAM message (917–919) ff the called party accepts the calling party's call, the call is connected and the conversation may commence (921–923). After the conversation has commenced, the PAAM resources may be released (925). PAAM resources may also be released if the call is not accepted and/or is not otherwise completed (921 and 925).

If in step 917 PAAM service is not active on the calling party terminal 401, then the conversation may commence after the call is connected and PAAM resources may be released (917 and 921–925).

Concurrent with step 917, an originating call signal including an O-PAAM message is sent to network 720 (927). SCP 721 sets up a call based on the originating call signal and forwards the O-PAAM message to the called party (929). Once the O-PAAM message has been received at the called party terminal, the calling party terminal number is looked up in the called party's local PAAM database 460 (931). If the calling party information is found in the local database 460, then personal D-PAAM information and personal R-PAAM information is retrieved from the PAAM database 460 (933–935).

If the calling party information is not found in the local database 460, then generic D-PAAM information and generic R-PRAM information is generated (937).

After suitable D-PAAM and R-PAAM information is retrieved and/or generated, the D-PAAM and the O-PAAM information may be combined (939). If the PAAM service is active in the called party terminal 450, then the combined D-PAAM and O-PRAM information may be presented to the called party (941–943). If PAAM is not active in the called party's terminal, the call with the calling party is connected and a conversation may commence (947 and 949).

After the combined D-PAAM and O-PAAM information is presented to the called party, additional R-PAAM information is sent to the calling party by the called party (945). Concurrent with step 917, an origination timer can be started to determine whether additional R-PAAM information from the called party is received before the timer expires (911–913). If the additional R-PAAM information has been received, then the additional R-PAAM information is also presented to the calling party (919). The additional R-PAAM information indicates the status of the pending call as indicated by the called party. If the call is accepted by the called party or otherwise connected (e.g., to a voice-mail system, etc), the conversation begins and the PAAM resources are released (921–925). If the call is rejected or otherwise not completed, the call is terminated and the PAAM resources are released (921 and 925). If, however, the additional R-PAAM information from the called party has not been received and the origination timer has expired, then the R-PAAM resources may be released and the call may be terminated (913–915). If the origination timer has not expired, then the PAAM interface 411 may continue to wait for the R-PAAM message from the called party (913 and 912).

One of ordinary skill in the art can employ any known hardware, software, and/or any combination thereof to implement the PAAM systems and/or PAAM services described above. The PAAM system block diagrams of FIGS. 1, 4 and 7 are given by way of example only and one of ordinary skill in the art can use a variety of different configurations and/or components to achieve the advantages of the PAAM systems and/or services in accordance with embodiments of the present invention. Similarly, the PAAM services shown in the flow diagrams and flow charts shown in FIGS. 2–3, 4–6, and 8–9, and described in corresponding text are also given by example and numerous other modifications and variations can be made by one of ordinary skill in the art.

The present invention has been described in terms of exemplary embodiments thereof. Numerous other embodiments, modifications and variations within the scope and spirit of the appended claims will occur to persons of ordinary skill in the art from a review of this disclosure.

What is claimed is:

1. A method for providing a personal audio alert message (PAAM) to a called party and a calling party during a call connection, the method comprising:

querying a PAAM database in response to a call origination by the calling party, the PAAM database comprising a plurality of PAAM message strings for each of the calling party and the called party, the plurality of PAAM message strings being customizable to define personal messages for exchange between the calling party and the called party during a call connection, and to define a preference for a message of the calling party over a message of the called party and vice versa, and in the absence of a defined personal message, one or more of the PAAM message strings presenting a generic message;

receiving one or more of the plurality of PAAM strings from the database in response to the query;

routing the call to the called party;

returning one or more of the plurality of PAAM strings from the database, to the called party in the routed call; and connecting the call if the called party accepts the call.

2. The method of claim 1, further comprising:

presenting a first PAAM string to the calling par while the call is being routed to the called party, the first PAAM string identifying the called party to the calling party.

3. The method of claim 1, further comprising:

presenting a second PAAM string and a third PAAM string to the called party before the called party answers the call, wherein the second PAAM string is a salutation to the called party and a third PAAM string identifies the calling party to the called party.

4. The method of claim 1, the method further comprising:

receiving a return called party response indicating the disposition of the call;

returning a fourth PAAM string based on the return called party response to the calling party, the fourth PAAM string indicating call status; and processing the call based on the return called party response.

5. The method of claim 4, wherein the called party response relates to at least one of accepting the call, rejecting the call, forwarding the call, placing the call on hold and connecting to voice-mail.

6. The method of claim 1, further comprising:

determining whether the calling party is a PAAM service subscriber; and if the calling party is determined to be a PAAM service subscriber, then based on the calling party number, retrieving the first PAAM string from the PAAM database.

7. The method of claim 1, further comprising:
determining whether the called party is a PAAM service subscriber; and
if the called party is determined to be a PAAM service subscriber, then based on a called party identifier, retrieving the second and third PAAM strings from the database.

8. The method of claim 7, wherein the second PAAM string is retrieved from at least one of a calling party's record and a called party's record that are stored in the PAAM database.

9. The method of claim 7, wherein the third PAAM string is retrieved from at least one of a calling party's record and a called party's record that are stored in the PAAM database.

10. The method of claim 1, further comprising:
retrieving a first PAAM string from a called party's record, wherein the first PAAM string defines a rule set for handling the call from the calling party identified in the called party's record; and
processing the call in accordance with the rule set defined by the first PAAM string from the called party's record.

11. A network apparatus for providing a personal audio alert message (PAAM) to a called party and a calling party during a call, the method comprising:
a switch to receive the call from the calling party; and
a memory for storing a plurality of PAAM message strings for each of the calling party and the called party, the plurality of PAAM message strings being customizable to define personal messages for exchange between the calling party and the called party during a call connection, and to define a preference for a message of the calling party over a message of the called party and vice versa, and in the absence of a defined personal message, one or more of the PAAM message strings presenting a generic message, wherein responsive to the call from the calling party, the switch queries the memory for PAAM one or more of the plurality of PAAM strings, returns a first PAAM string identifying the called party to the calling party, returns a second PAAM string to the called party that represents a salutation to the called party, returns a third PAAM string to the called party that identifies the calling party to the called party, and connects the call if the called party answers the call.

12. The network apparatus of claim 11, wherein the switch further receives a return called party response indicating the disposition of the call and returns a fourth PAAM string indicating call status based on the return called party response to the calling party.

13. The network apparatus of claim 12, wherein the switch further processes the call based on the return called party response.

14. The network apparatus of claim 11, wherein the switch further determines whether the calling party is a PAAM service subscriber and if the calling party is determined to be a PAAM service subscriber, then based on the calling party number, the switch further retrieves the first PAAM string from the memory.

15. The network apparatus of claim 11, wherein the switch further determines whether the called party is a PAAM service subscriber and if the called party is determined to be a PAAM service subscriber, then based on a called party identifier, the switch further retrieves the second and third PAAM strings from the memory.

16. The network apparatus of claim 11, wherein the first PAAM string in the memory defines a rule set for handling the call from the calling party and wherein the switch processes the call in accordance with the rule set defined by the first PAAM string defining the rule set.

17. A machine-readable medium having stored thereon a plurality of executable instructions, the plurality of instructions comprising instructions to:
query a personal audio alert message (PAAM) database in response to a call origination by the calling party, the PAAM database comprising a plurality of PAAM message strings for each of the calling pa and the called party, the plurality of PAAM message strings being customizable to define personal messages for exchange between the calling party and the called party during a call connection, and to define a preference for a message of the calling party over a message of the called party and vice versa, and in the absence of a defined personal message, one or more of the PAAM message strings presenting a generic message;
receive one or more of the plurality of PAAM strings from the database in response to the query;
route the call to the called party;
return one or more of the plurality of PAAM strings from the database, to the called party in the routed call
connect the call if the called party accepts the call.

18. The machine-readable medium of claim 17, having stored thereon further executable instructions to:
present a first PAAM string to the calling party while the call is being routed to the called party, the first PAAM string identifying the called party to the calling party.

19. The machine-readable medium of claim 17, having stored thereon further executable instructions to:
present a second PAAM string and a third PAAM string to the called party before the called party answers the call, wherein the second PAAM string is a salutation to the called party and a third PAAM string identifies the calling party to the called party.

20. The machine-readable medium of claim 17, having stored thereon further executable instructions to:
receive a return called party response indicating the disposition of the call;
return a fourth PAAM string based on the return called party response to the calling party, the fourth PAAM string indicating call status; and
process the call based on the return called party response.

21. The machine-readable medium of claim 17 having stored thereon further executable instructions to:
determine whether the calling party is a PAAM service subscriber; and
retrieve the first PAAM string from the PAAM database based on the calling party number, if the calling party is determined to be a PAAM service subscriber.

22. The machine-readable medium of claim 17 having stored thereon further executable instructions to:
determine whether the called party is a PAAM service subscriber; and
retrieve the second and third PAAM strings from the database based on a called party identifier, if the called party is determined to be a PAAM service subscriber.

23. The machine-readable medium of claim 17, having stored thereon further executable instructions to:
retrieve the first PAAM string from a called party's record, wherein the first PAAM string defines a rule set for handling the call from the calling party identified in the called party's record; and process the call in accordance with the rule set defined by the first PAAM string from the called party's record.

24. A method for presenting personal audio alert messages to a called party and a calling party during a call, the method comprising:

originating the call to the called party by the calling party;

determining whether a personal audio alert message (PAAM) service is enabled;

searching a local calling party PAAM database for a called party number if the PAAM service is enabled, the local calling PAAM database comprising a plurality of PAAM message strings for each of the calling party and the called party, the plurality of PAAM message strings being customizable to define personal messages for exchange between the calling party and the called party during a call connection, and to define a preference for a message of the calling party over a message of the called party and vice versa, and in the absence of a defined personal message, one or more of the PAAM message strings presenting a generic message;

if the called party number is found in the local calling party database, retrieving a personalized first PAAM string associated with the called party number from the local calling party PAAM database, the personalized first PAAM string including a personalized message relating to the identity of the called party and the personalized first PAAM string is stored in the local calling party PAAM database by the calling party;

presenting the calling party with the personalized first PAAM string while the call is being routed to the called party; and if the called party number is not found in the local calling party database, presenting the calling party with a generic first PAAM string, the generic first PAAM string including a generic message relating to the identity of the called party.

25. The method of claim 24, wherein the generic first PAAM string is generated by:

retrieving the identity of the called party based on the called party number using an automatic number identification (ANI) look-up.

26. The method of claim 24, further comprising:

if the PAAM service is not enabled, the local called party PAAM database is not searched and the called party is not presented with the personalized second and third PAAM strings.

27. The method of claim 24, further comprising:

connecting the call by the calling party to the called party;

searching a local called party PAAM database for a calling party number if the PAAM service is enabled;

if the calling party number is found in the local called party database, retrieving personalized second and third PAAM strings associated with the calling party number from the local called party PAAM database, the personalized second and third PAAM strings, the personalized second PAAM string including a personalized salutation to the called party and the personalized third PAAM string including a personalized message relating to the identity of the calling party;

presenting the called party with the personalized second and third PAAM strings; and if the calling party number is not found in the local called party database, presenting the called party with a generic second and third PAAM strings, the generic second PAAM string including a generic salutation to the called party and the generic third PAAM string including a generic message relating to the identity of the calling party.

28. The method of claim 24, further comprising:

connecting the call between the called party and the calling party after the called party picks up the call; and releasing the PAAM service resources after the call is connected.

29. The method of claim 24, further comprising:

receiving a fourth PAAM string based on a return called party response, the fourth PAAM string indicating call status; and processing the call based on the return called party response.

30. The method of claim 29, wherein the called party response relates to at least one of accepting the call, rejecting the call, forwarding the call, placing the call on hold and connecting to voice-mail.

31. An apparatus for providing a personal audio alert service to a called party and a calling party during a call connection, the apparatus comprising:

a memory to store called party information, calling party information and associated personal audio alert message (PAAM) information, the PAAM information comprising a plurality of PAAM message strings for each of the calling party and the called part, the plurality of PAAM message strings being customizable to define personal messages for exchange between the calling party and the called party during a call connection, and to define a preference for a message of the calling party over a message of the called party and vice versa, and in the absence of a defined personal message, one or more of the PAAM message strings presenting a generic message;

a PAAM interface to search the memory for a called party number and to retrieve a personalized first PAAM string from the associated PAAM information if the called party number is found in the memory;

a PAAM module to receive the personalized first PAAM string and to generate a first personalized message including the personalized first PAAM string when a call is originated, the first personalized message including an identifier for the called party and the personalized first PAAM string is stored in the memory by the calling party; and an output device to output the generated first personalized message to the calling party while the call is connected and to further output a generic message to the calling party including a generic PAAM string including an identifier relating to the identity of the called party if the called party number is not found in the memory.

32. The apparatus of claim 31, if the called party number is not found in the memory, the PAAM module further generates the generic message including the generic PAAM string and forwards the generated generic message to the output device.

33. The apparatus of claim 32, wherein the PAAM interface searches the memory for a calling party number and retrieves a personalized second PAAM string and a personalized third PAAM string from the associated PAAM information if the calling party number is found when the call is received, and the PAAM module further receives the personalized second and personalized third PAAM strings and generates a second personalized message including the personalized second and personalized third PAAM strings when the call is received, the second personalized message including an identifier for the calling party.

34. The apparatus of claim 33, wherein the PAAM module further generates a salutation to be output to the called party included in the second personalized message.

35. The apparatus of claim 33, wherein the output device outputs the generated second personalized message to the called party.

36. The apparatus of claim 33, wherein the PAAM module further generates a second generic message that includes an identifier for the calling party if the calling party number is not found in the memory and the output device further outputs the second generic message to the called party.

37. The apparatus of claim 36, wherein the PAAM module further generates a salutation to be output to the called party included in the second generic message.

38. The apparatus of claim 31, wherein the output device is a display.

39. The apparatus of claim 31, wherein the output device is a speaker.

* * * * *

UNITED STATES PATENT AND TRADEMARK OFFICE
CERTIFICATE OF CORRECTION

PATENT NO. : 6,950,504 B1
APPLICATION NO. : 09/899956
DATED : September 27, 2005
INVENTOR(S) : Marx et al.

It is certified that error appears in the above-identified patent and that said Letters Patent is hereby corrected as shown below:

Title page, item [57]
In the Abstract, line 5: change "one ore" to --one or--.

| Column | Line | |
|---|---|---|
| 8 | 2 | Change "1 50%" tp --50%--. |
| 9 | 21 | Change "PAM" to --PAAM--. |
| 13 | 21 | Change "If In" to --If in--. |
| 14 | 38 | Change "stored In" to --stored in--. |
| 16 | 39 | Change "par" to --party--. |
| 18 | 12 | Change "calling pa" to --calling party--. |

Signed and Sealed this

Third Day of October, 2006

JON W. DUDAS
*Director of the United States Patent and Trademark Office*